US010985671B2

(12) United States Patent
Ginnareddy et al.

(10) Patent No.: US 10,985,671 B2
(45) Date of Patent: Apr. 20, 2021

(54) ALTERNATE ARM CONVERTER (71) Applicant: GENERAL ELECTRIC TECHNOLOGY GMBH, Baden (CH)

(72) Inventors: Rajaseker Ginnareddy, Stafford (GB); David Reginald Trainer, Derbyshire (GB); Carl David Barker, Stone (GB)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 0 days.

(21) Appl. No.: 16/608,166

(22) PCT Filed: Mar. 26, 2018

(86) PCT No.: PCT/EP2018/057666
§ 371 (c)(1),
(2) Date: Oct. 25, 2019

(87) PCT Pub. No.: WO2018/197129
PCT Pub. Date: Nov. 1, 2018

(65) Prior Publication Data
US 2020/0177096 A1 Jun. 4, 2020

(30) Foreign Application Priority Data
Apr. 25, 2017 (EP) ................................. 17168007

(51) Int. Cl.
*H02M 7/00* (2006.01)
*H02M 7/483* (2007.01)
(Continued)

(52) U.S. Cl.
CPC ............ *H02M 7/483* (2013.01); *H02M 1/12* (2013.01); *H02M 1/14* (2013.01); *H02M 7/5387* (2013.01); *H02M 2007/4835* (2013.01)

(58) Field of Classification Search
CPC ...... H02M 7/483; H02M 1/12; H02M 7/5387; H02M 2007/4835
See application file for complete search history.

(56) References Cited

U.S. PATENT DOCUMENTS 7,433,216 B2 * 10/2008 Romenesko ............ H02M 1/12
363/132
8,867,242 B2 * 10/2014 Clare ..................... H02M 7/797
363/35

FOREIGN PATENT DOCUMENTS

EP 2755317 A1 7/2014
EP 2998752 A1 3/2016
EP 2727234 B1 9/2016

OTHER PUBLICATIONS

Merlin et al.: "Cell capacitor sizing in multilevel converters: cases of the modular multilevel converter and alternate arm converter", 2015, vol. 8, pp. 350-360.
(Continued)

*Primary Examiner* — Adolf D Berhane
*Assistant Examiner* — Afework S Demisse
(74) *Attorney, Agent, or Firm* — Eversheds Sutherland (US) LLP (57) ABSTRACT A converter (30) comprises first and second DC terminals (32,34) connectable in use to a DC network (40), the converter (30) including a converter limb (36) extending between the DC terminals (32,34), the converter limb (36) including first and second limb portions separated by an AC terminal (38), the AC terminal (38) connectable in use to an AC voltage, each limb portion including at least one director switch (44) connected in series with a waveform synthesizer between the AC terminal (44) and a respective one of the first and second DC terminals (32,34), the waveform synthesizers operable to control the modulation of an AC voltage waveform at the AC terminal (38), each director
(Continued)

switch (44) operable to switch the respective waveform synthesizer into and out of circuit between the respective DC terminal (32,34) and the AC terminal (38); and a controller (56) programmed to selectively control the switching of the director switches (44) to switch both of the limb portions into circuit concurrently to form a current conduction path between the DC terminals (32,34), the current conduction path configured to carry a current for presentation to the DC network (40), wherein the controller (56) is programmed to selectively operate the waveform synthesizers to inject at least one harmonic component to modulate the AC voltage waveform at the AC terminal (38) so that during the formation of the current conduction path the magnitude of the modulated AC voltage waveform is lower than the magnitude of the fundamental component of the AC voltage waveform, and wherein the at least one harmonic component is a non-triplen harmonic component.

15 Claims, 5 Drawing Sheets

(51) Int. Cl.
  *H02M 1/12*   (2006.01)
  *H02M 1/14*   (2006.01)
  *H02M 7/5387*  (2007.01)

(56) References Cited

OTHER PUBLICATIONS

International Search Report of PCT/EP2018/057666 dated May 29, 2018.
European Search Report for Application No. 17168007.7 dated Oct. 11, 2017.

\* cited by examiner

ALTERNATE ARM CONVERTER

CROSS-REFERENCE TO RELATED APPLICATIONS

This application is a U.S. National Stage Application under 35 U.S.C. 371 and claims the priority benefit of International Application No. PCT/EP2018/057666 filed Mar. 26, 2018, which claims priority to EP17168007.7, filed Apr. 25, 2017, which are both incorporated herein by reference.

This invention relates to a converter and to a parallel-connected converter assembly, preferably for use in high voltage direct current transmission and reactive power compensation.

In power transmission networks alternating current (AC) power is typically converted to direct current (DC) power for transmission via overhead lines and/or under-sea cables. This conversion removes the need to compensate for the AC capacitive load effects imposed by the transmission line or cable and reduces the cost per kilometre of the lines and/or cables, and thus becomes cost-effective when power needs to be transmitted over a long distance.

Converters are used to convert between AC power and DC power.

According to a first aspect of the invention, there is provided a converter comprising first and second DC terminals connectable in use to a DC network, the converter including a converter limb extending between the DC terminals, the converter limb including first and second limb portions separated by an AC terminal, the AC terminal connectable in use to an AC voltage, each limb portion including at least one director switch connected in series with a waveform synthesizer between the AC terminal and a respective one of the first and second DC terminals, the waveform synthesizers operable to control the modulation of an AC voltage waveform at the AC terminal, each director switch operable to switch the respective waveform synthesizer into and out of circuit between the respective DC terminal and the AC terminal; and

- a controller programmed to selectively control the switching of the director switches to switch both of the limb portions into circuit concurrently to form a current conduction path between the DC terminals, the current conduction path configured to carry a current for presentation to the DC network,
- wherein the controller is programmed to selectively operate the waveform synthesizers to inject at least one harmonic component to modulate the AC voltage waveform at the AC terminal so that during the formation of the current conduction path the magnitude of the modulated AC voltage waveform is lower than the magnitude of the fundamental component of the AC voltage waveform, and wherein the at least one harmonic component is a non-triplen harmonic component.

The at least one harmonic component may be an odd-numbered and non-triplen harmonic component. Preferably the at least one harmonic component is selected from a group including $5^{th}$, $7^{th}$, $11^{th}$, $13^{th}$, $17^{th}$, $19^{th}$, $23^{rd}$ and $27^{th}$ harmonic components.

The formation of the current conduction path in the converter permits the flow of a current between the DC terminals via the converter limb with the limb portions switched into circuit concurrently. In use, the current may be employed to modify the harmonic characteristics of the converter and/or the DC network. This advantageously obviates the need for separate hardware to modify the harmonic characteristics of the converter and/or the DC network, thus providing savings in terms of cost, weight and footprint.

For example, the current conduction path may be configured to carry an alternating current for presentation to the DC network. Alternating current can, for example, be used to suppress ripple in the DC network. The alternating current in the current conduction path may, for example, be shaped to minimise or cancel a ripple current in the DC network. This allows the converter to act as an active DC filter, thus reducing or obviating the need to use separate passive and/or active filtering hardware.

By modulating the AC voltage waveform at the AC terminal via the injection of the at least one harmonic component, it becomes possible to reduce the magnitude of the modulated AC voltage waveform in comparison to the magnitude of the fundamental component of the AC voltage waveform during the formation of the current conduction path. This in turn beneficially permits a reduction in the voltage rating of each waveform synthesizer, which allows optimisation of the number of components of the waveform synthesizers in order to provide savings in terms of cost, weight and footprint of the converter and improve the efficiency of the converter.

In an exemplary operation of the converter to transfer power between AC and DC networks, the flow of current in the converter may alternate between the limb portions over a duty cycle such that one limb portion is configured in a conducting state while the other limb portion is configured in a non-conducting state. The controller may therefore be programmed to selectively control the switching of the director switches to switch both of the limb portions into circuit concurrently to form the current conduction path in the converter during a transition between the conducting and non-conducting states of each limb portion.

The or each waveform synthesizer may be a voltage waveform synthesizer or a current waveform synthesizer.

The or each harmonic component may be a harmonic voltage component or a harmonic current component. In the case of the harmonic voltage component, the controller may be programmed to selectively operate the waveform synthesizers to inject at least one harmonic voltage component to modulate the AC voltage waveform at the AC terminal. In the case of the harmonic current component, the controller may be programmed to selectively operate the waveform synthesizers to inject at least one harmonic current component which in turn results in the generation of one or more corresponding harmonic voltage components to modulate the AC voltage waveform at the AC terminal.

The converter may include a plurality of converter limbs, each converter limb extending between the DC terminals, the AC terminal of each converter limb being connectable in use to a respective phase of a multi-phase AC voltage.

When the converter includes a plurality of converter limbs, the controller may be further programmed to selectively control the switching of the director switches of each of the plurality of converter limbs to switch both of the corresponding limb portions into circuit concurrently to form a respective current conduction path in the converter. The controller may be further programmed to selectively control the switching of the director switches of the plurality of converter limbs to form the respective current conduction paths at respective different times in the operating cycle of the converter. The formation of different current conduction paths at different times is compatible with the multi-phase operation of the plurality of converter limbs to interconnect a multi-phase AC voltage and a DC voltage.

In a preferred embodiment of the invention, each waveform synthesizer may be or may include a chain-link converter. A given chain-link converter may include a plurality of modules (e.g. a plurality of series-connected modules), each module including at least one switching element and at least one energy storage device, the or each switching element and the or each energy storage device in each module arranged to be combinable to selectively provide a voltage source. The invention is particularly beneficial in that it permits optimisation of the number of switching elements in the plurality of modules of a given chain-link converter.

The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner, switching of the or each switching element in each module causes the chain-link converter to provide a stepped variable voltage source, which permits the generation of a voltage waveform across the chain-link converter using a step-wise approximation.

A given director switch or switching element may include at least one self-commutated switching device. The or each self-commutated switching device may be an insulated gate bipolar transistor, a gate turn-off thyristor, a field effect transistor, an injection-enhanced gate transistor, an integrated gate commutated thyristor, a gas tube switch, or any other self-commutated switching device. The number of switching devices in the given director switch or switching element may vary depending on the required voltage and current ratings of that director switch or switching element.

The given director switch or switching element may further include a passive current check element that is connected in anti-parallel with the or each switching device.

The or each passive current check element may include at least one passive current check device. The or each passive current check device may be any device that is capable of limiting current flow to only one direction, e.g. a diode. The number of passive current check devices in each passive current check element may vary depending on the required voltage and current ratings of that passive current check element.

A given energy storage device may be any type of energy storage device that is capable of releasing and storing energy to provide a voltage, such as a capacitor, fuel cell, or a battery.

Each chain-link converter may include at least one first module. The or each first module may include at least one switching element and at least one energy storage device. The or each switching element and the or each energy storage device in the or each first module may be arranged to be combinable to selectively provide a unidirectional voltage source. An exemplary first module may include a pair of switching elements connected in parallel with an energy storage device in a half-bridge arrangement to define a 2-quadrant unipolar module that can provide zero or positive voltage and can conduct current in both directions.

Each chain-link converter may further include at least one second module. The or each second module may include at least one switching element and at least one energy storage device. The or each switching element and the or each energy storage device in the or each second module may be arranged to be combinable to selectively provide a bidirectional voltage source. An exemplary second module may include two pairs of switching elements connected in parallel with an energy storage device in a full-bridge arrangement to define a 4-quadrant bipolar module that can provide negative, zero or positive voltage and can conduct current in both directions.

The inclusion of the or each second module in each chain-link converter enables the converter to control the AC voltage waveform at the AC terminal to have peak voltages that are respectively higher in magnitude than the DC voltages at the DC terminals. In addition the number of second modules in each chain-link converter may be defined to provide the converter with DC fault blocking capability.

In embodiments of the invention, the controller may be further programmed to selectively operate the waveform synthesizers to inject one or more zero phase sequence triplen harmonic components to modulate the AC voltage waveform at the AC terminal so that the peak voltage of the modulated AC voltage waveform is lower in magnitude than the peak voltage of the fundamental component of the AC voltage waveform.

By reducing the peak voltage of the modulated AC voltage waveform to be lower than the peak voltage of the fundamental component of the AC voltage waveform, it becomes possible to not only reduce the voltage ratings of the director switches and waveform synthesizers so as to permit optimisation of the number of components of the director switches and waveform synthesizers to provide savings in terms of cost, weight and footprint of the converter and improve the efficiency of the converter, but also reduce voltage stress on an associated transformer to permit a reduction in the insulation class of the transformer and a reduction in clearance distance which enables a more compact station layout to be achieved.

According to a second aspect of the invention, there is provided a parallel-connected converter assembly comprising first and second converters, wherein either or each of the first and second converters is in accordance with the converter of the invention as described hereinabove with respect to the first aspect of the invention and its embodiments, the parallel-connected converter assembly including first and second DC transmission media, the first and second DC transmission media respectively including first and second DC network terminals connectable in use to a DC network, the first DC transmission medium interconnecting the first DC terminals of the first and second converters, the second DC transmission medium interconnecting the second DC terminals of the first and second converters.

In use, the parallel-connected converter assembly is operated to transfer power between AC and DC networks. When compared to a single converter, a parallel-connected converter assembly is compatible with higher current ratings at higher power ratings (e.g. 1000 MW or higher).

The aforementioned cost, weight and footprint savings and improvement in the efficiency of the converter of the invention as a result of reducing the magnitude of the modulated AC voltage waveform in comparison to the magnitude of the fundamental component of the AC voltage waveform during the formation of the current conduction path is beneficial when applied to a parallel-connected converter assembly which comprises two converters connected in parallel.

In embodiments of the invention, the AC terminal of the first converter may be connected to a first AC voltage, the AC terminal of the second converter may be connected to a second AC voltage, and the first and second AC voltages may be configured to be phase shifted relative to each other.

In such embodiments, the first and second AC voltages may be configured to be phase shifted relative to each other so that, in use, at least one harmonic current component appearing at an AC side of the first converter is in anti-phase with at least one harmonic current component appearing at an AC side of the second converter such that the harmonic current components cancel each other out, wherein the appearance of each harmonic current component at the AC side of the corresponding converter is caused by the operation of the waveform synthesizers to inject the at least one harmonic component to modulate the AC voltage waveform at the AC terminal of the corresponding converter. Cancelling the harmonic current components in this manner prevents the harmonic current components from adversely affecting an AC network voltage connected to the AC sides of the converters.

In further such embodiments, the first and second AC voltages may be operatively linked to an AC network voltage, the parallel-connected converter assembly may further include a transformer assembly configured to connect the AC network voltage to both of the first and second AC voltages, and the transformer assembly may be configured so that the first and second AC voltages are phase shifted relative to each other.

The provision of the transformer assembly provides a reliable way of phase shifting the first and second AC voltages to cancel the harmonic current components arising from the operation of the waveform synthesizers to inject the at least one harmonic component to modulate the AC voltage waveform at the AC terminal of each converter while providing galvanic isolation between the AC network voltage and both of the first and second AC voltages.

In an exemplary configuration of the transformer assembly, the transformer assembly may be configured in an arrangement in which a primary winding of the transformer assembly is connected to the AC network voltage, a star-connected secondary winding of the transformer assembly is connected to one of the first and second AC voltages, and a delta-connected secondary winding of the transformer assembly is connected to the other of the first and second AC voltages.

The provision of the star-connected and delta-connected secondary windings provide a reliable means of phase shifting the first and second AC voltages relative to each other to achieve the desired cancellation of the harmonic current components arising from the operation of the waveform synthesizers to inject the at least one harmonic component to modulate the AC voltage waveform at the AC terminal of each converter.

It will also be appreciated that the use of the terms "first" and "second", and the like, in this patent specification is merely intended to help distinguish between similar features (e.g. the first and second DC terminals, the first and second modules, and so on), and is not intended to indicate the relative importance of one feature over another feature, unless otherwise specified.

Preferred embodiments of the invention will now be described, by way of non-limiting examples, with reference to the accompanying drawings in which.

Figure 1:
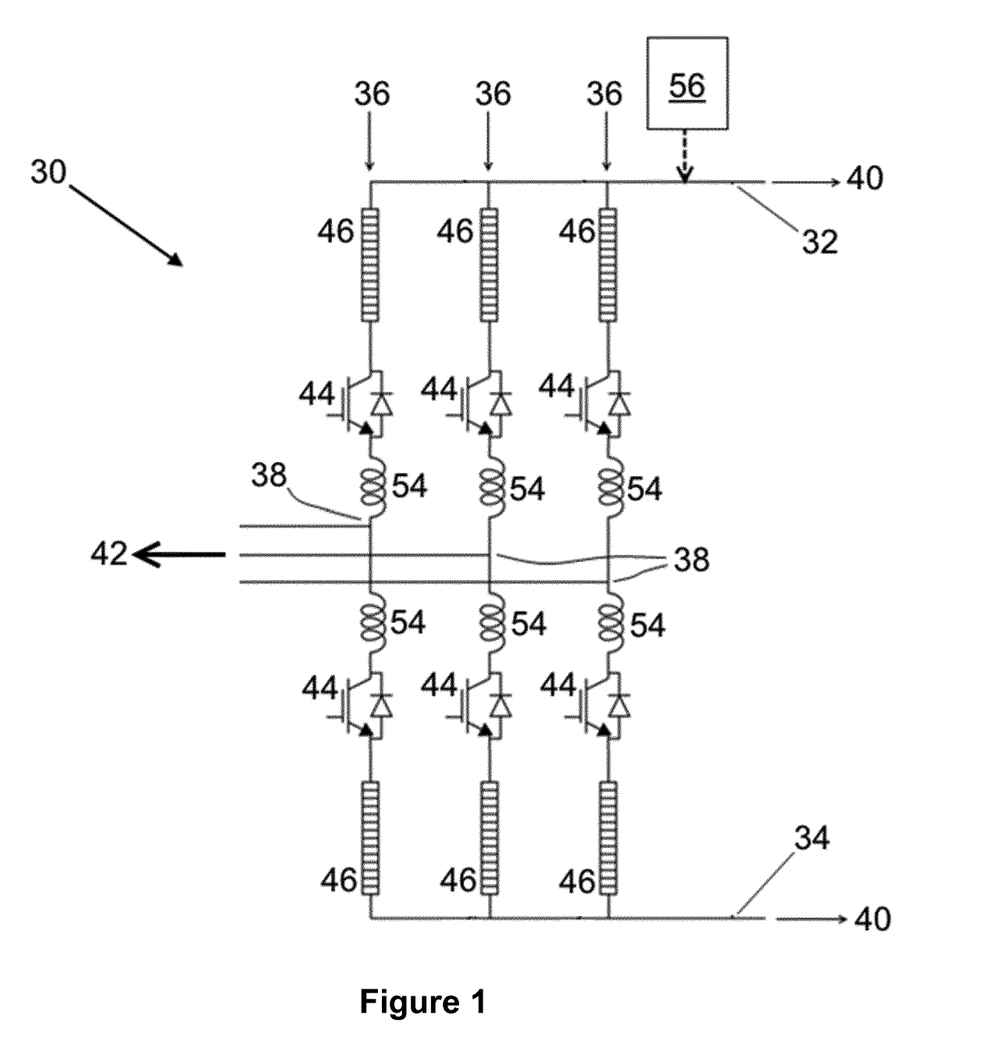
FIG. 1 shows schematically an alternate arm converter according to a first embodiment of the invention.

An alternate arm converter according to a first embodiment of the invention is shown in FIG. 1 and is designated generally by the reference numeral 30.

The converter 30 includes first and second DC terminals 32,34 and a plurality of converter limbs 36. Each converter limb 36 extends between the DC terminals 32,34, and includes first and second limb portions separated by a respective AC terminal 38. In each converter limb 36, the first limb portion extends between the first DC terminal 32 and the AC terminal 38, while the second limb portion extends between the second DC terminal 34 and the AC terminal 38.

In use, the first and second DC terminals 32,34 are connected to respective DC voltages of a DC network 40, while each AC terminal 38 is connected to a respective phase of a three-phase AC voltage that is in turn linked to a three-phase AC network 42.

Each limb portion includes a director switch 44 connected in series with a chain-link converter 46 between the AC terminal 38 and a respective one of the first and second DC terminals 32,34.

Each director switch 44 includes a plurality of series-connected insulated gate bipolar transistors (IGBT), which is represented in FIG. 1 by a single IGBT. It is envisaged that, in other embodiments of the invention, each plurality of series-connected IGBTs in each director switch 44 may be replaced by a single IGBT.

The configuration of the limb portions in this manner means that, in use, the director switch 44 of each limb portion is switchable to switch the respective limb portion and therefore the respective chain-link converter 46 into and out of circuit between the respective AC and DC terminals 38,32,34.

Figure 2:
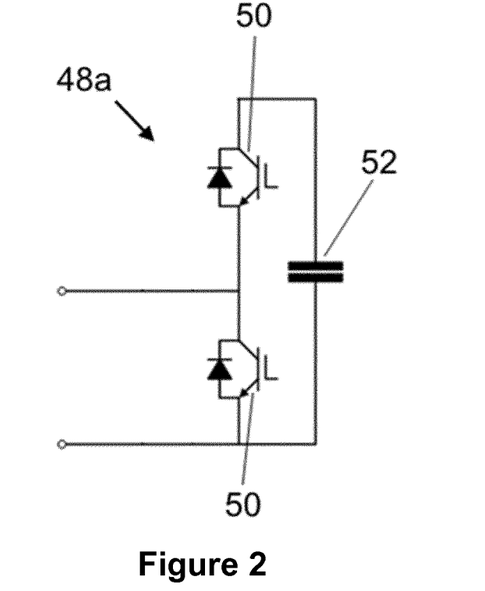
FIGS. 2 and 3 show schematically exemplary chain-link converter modules.
Figure 3:
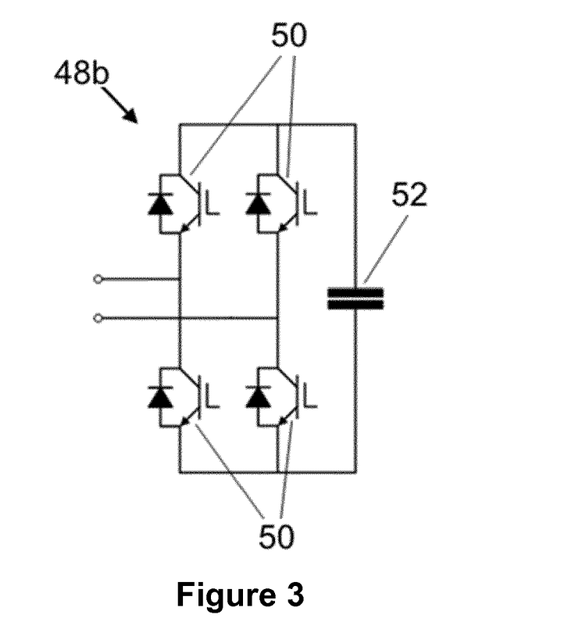

Each chain-link converter 46 includes a plurality of series-connected modules, which are in the form of a combination of first and second modules 48a,48b. FIG. 2 shows schematically the structure of each first module 48a, and FIG. 3 shows schematically the structure of each second module 48b.

Each first module 48a includes a pair of switching elements 50 and a capacitor 52 in a half-bridge arrangement. The pair of switching elements 50 are connected in parallel with the capacitor 52 in a half-bridge arrangement to define a 2-quadrant unipolar module that can provide zero or positive voltage and can conduct current in both directions.

Each second module 48b includes two pairs of switching elements 50 and a capacitor 52 in a full-bridge arrangement. The two pairs of switching elements 50 are connected in parallel with the capacitor 52 in a full-bridge arrangement to define a 4-quadrant bipolar module that can provide negative, zero or positive voltage and can conduct current in both directions.

Each switching element 50 includes an IGBT that is connected in parallel with an anti-parallel diode. It is envisaged that, in other embodiments of the invention, each single IGBT in each switching element 50 may be replaced by a plurality of series-connected IGBTs.

It is also envisaged that, in other embodiments of the invention, each IGBT or multiple series-connected IGBTs may be replaced by a gate turn-off thyristor, a field effect transistor, an injection-enhanced gate transistor, an integrated gate commutated thyristor, a gas tube switch, or any other self-commutated semiconductor device. It is also envisaged that, in other embodiments of the invention, each diode may be replaced by a plurality of series-connected diodes.

The capacitor 52 of each module 48a,48b is selectively bypassed or inserted into the corresponding chain-link converter 46 by changing the states of the switching elements 50. This selectively directs current through the capacitor 52 or causes current to bypass the capacitor 52, so that each first module 48a is able to provide a zero or positive voltage and so that each second module 48b is able to provide a negative, zero or positive voltage.

The capacitor 52 of a given module 48a,48b is bypassed when the switching elements 50 in the module 48a,48b are configured to form a short circuit in the module 48a,48b, whereby the short circuit bypasses the capacitor 52. This causes current in the corresponding chain-link converter 46 to pass through the short circuit and bypass the capacitor 52, and so the module 48a,48b provides a zero voltage, i.e. the module 48a,48b is configured in a bypassed mode.

The capacitor 52 of a given module 48a,48b is inserted into the corresponding chain-link converter 46 when the switching elements 50 in the module 48a,48b are configured to allow the current in the corresponding chain-link converter 46 to flow into and out of the capacitor 52. The capacitor 52 then charges or discharges its stored energy so as to provide a non-zero voltage, i.e. the module 48a,48b is configured in a non-bypassed mode. In the case of each second module 48b, the full-bridge arrangement permits configuration of the switching elements 50 in the second module 48b to cause current to flow into and out of the capacitor 52 in either direction. This in turn means that each second module 48b can be configured to be inserted into the corresponding chain-link converter 46 to provide a negative or positive voltage in the non-bypassed mode.

In this manner, the switching elements 50 in each module 48a,48b are switchable to control flow of current through the corresponding capacitor 52.

It is possible to build up a combined voltage across each chain-link converter 46, which is higher than the voltage available from each of its individual modules 48a,48b, via the insertion of the capacitors 52 of multiple modules 48a,48b, each providing its own voltage, into each chain-link converter 46. In this manner, switching of the switching elements 50 in each module 48a,48b causes each chain-link converter 46 to provide a stepped variable voltage source, which permits the generation of a voltage waveform across each chain-link converter 46 using a step-wise approximation. Hence, the switching elements 50 in each chain-link converter 46 are switchable to selectively permit and inhibit flow of current through the corresponding capacitor 52 in order to control a voltage across the corresponding chain-link converter 46.

It is envisaged that, in other embodiments of the invention, each module 48a,48b may be replaced by another type of module, which includes at least one switching element and at least one energy storage device, the or each switching element and the or each energy storage device in each module being arranged to be combinable to selectively provide a voltage source.

It is envisaged that, in other embodiments of the invention, the capacitor 52 in each module 48a,48b may be replaced by another type of energy storage device which is capable of storing and releasing energy to selectively provide a voltage, e.g. a battery or a fuel cell.

Each limb portion further includes a valve reactor 54 connected in series with the corresponding director switch 44 and chain-link converter 46.

The converter 30 further includes a controller 56 programmed to control the switching of the director switches 44 and the switching elements 50 of the chain-link converters 46 in the limb portions.

In order to transfer power between the AC and DC networks 42,40, the controller 56 controls the switching of the director switches 44 to switch the respective chain-link converters 46 into and out of circuit between the respective AC and DC terminals 38,32,34 to interconnect the AC and DC networks 42,40. When a given chain-link converter 46 is switched into circuit between the respective AC and DC terminals 38,32,34, the controller 56 switches the switching elements 50 of the modules 48a,48b of the given chain-link converter 46 to provide a stepped variable voltage source and thereby generate a voltage waveform so as to control the configuration of an AC voltage waveform at the corresponding AC terminal 38 to facilitate the transfer of power between the AC and DC networks 42,40.

To generate a positive AC voltage component of an AC voltage waveform at the AC terminal 38 of a given converter limb 36, the director switch 44 of the first limb portion is closed (to switch the chain-link converter 46 connected in series therewith into circuit between the first DC terminal 32 and the corresponding AC terminal 38) and the director switch 44 of the second limb portion is opened (to switch the chain-link converter 46 connected in series therewith out of circuit between the second DC terminal 34 and the corresponding AC terminal 38).

To generate a negative AC voltage component of an AC voltage waveform at the AC terminal 38 of a given converter limb 36, the director switch 44 of the second limb portion is closed (to switch the chain-link converter 46 connected in series therewith into circuit between the second DC terminal 34 and the corresponding AC terminal 38) and the director switch 44 of the first limb portion is opened (to switch the chain-link converter 46 connected in series therewith out of circuit between the first DC terminal 32 and the corresponding AC terminal 38).

When a given converter limb 36 transitions between the corresponding positive and negative AC voltage components, the controller 56 controls the switching of the corresponding director switches 44 to switch both of the corresponding limb portions into circuit concurrently to form a current conduction path in the converter 30. At the same time the chain-link converters 46 are operated to inject a controlled alternating current into the current conduction path for presentation to the DC network 40.

In use, the current may be employed to modify the harmonic characteristics of the converter 30 and/or the DC network 40. The alternating current in the current conduction path may, for example, be shaped to minimise or cancel a ripple current in the DC network 40. This allows the converter 30 to act as an active DC filter, thus reducing or obviating the need to use separate passive and/or active filtering hardware.

The controller 56 controls the switching of the director switches 44 of the plurality of converter limbs 36 to form the respective current conduction paths at respective different times in the operating cycle of the converter 30 in line with the operation of the converter 30 to transfer power between the AC and DC networks 42,40.

Figure 4:
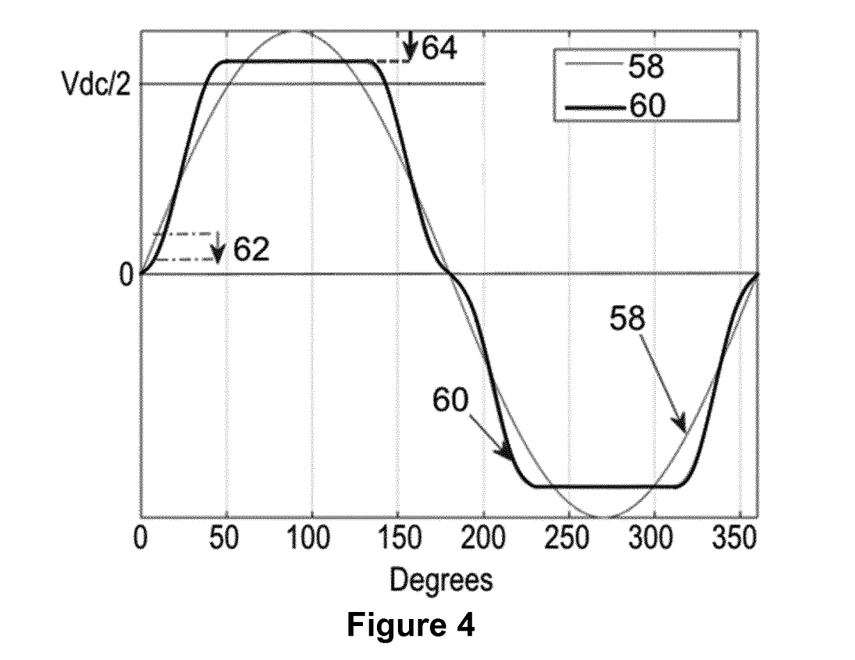
FIG. 4 illustrates a modulated AC voltage waveform at an AC terminal of the alternate arm converter of FIG. 1.

During the formation of the current conduction path in a given converter limb 36, the controller 56 selectively operates the chain-link converters 46 to inject at least one harmonic voltage component to modulate the AC voltage waveform at the AC terminal 38 so as to cause a reduction 62 in the magnitude of the modulated AC voltage waveform 60 in comparison to the magnitude of the fundamental component 58 of the AC voltage waveform. In this embodiment, the or each harmonic voltage component is preferably selected from a group including $5^{th}$ and $7^{th}$ harmonic voltage components.

It is envisaged that, in other embodiments of the invention, the controller 56 may be programmed to selectively operate the chain-link converters 46 to inject at least one harmonic current component which in turn results in the generation of one or more corresponding harmonic voltage components to modulate the AC voltage waveform at each AC terminal 38. In such embodiments, the chain-link converters 46 may be operated to control the voltages across the respective valve reactors 54 to inject the or each harmonic current component.

By reducing the magnitude of the modulated AC voltage waveform 60 in comparison to the magnitude of the fundamental component 58 of the AC voltage waveform during the formation of the current conduction path, it becomes possible to reduce the voltage rating of each chain-link converter 46, which in turn allows optimisation of the number of components of each chain-link converter 46 in order to provide savings in terms of cost, weight and footprint of the converter 30 and improve the efficiency of the converter 30. In particular, the reduction in voltage rating of each chain-link converter 46 allows a corresponding reduction in the number of modules 48*a*,48*b*.

The inclusion of the second modules 48*b* in each chain-link converter 46 enables the converter 30 to control the AC voltage waveform at each AC terminal 38 to have peak voltages that are respectively higher in magnitude than the DC voltages at the DC terminals 32,34. The number of second modules 48*b* in each chain-link converter 46 may be defined to provide the converter 30 with full or partial DC fault blocking capability in order to permit the operation of the converter 30 to prevent a fault current from flowing through the converter 30 in the event of a DC fault in the DC network 40.

The respective numbers of first and second modules 48*a*,48*b* in each chain-link converter 46 depends on the required DC fault blocking capability of the converter 30. If the converter 30 is not required to have DC fault blocking capability, then the number of second modules 48*b* in each chain-link converter 46 only needs to be sufficient to enable the control of the AC voltage waveform at each AC terminal 38 to have peak voltages that are respectively higher in magnitude than the DC voltages at the DC terminals 32,34. This thereby permits a reduction in the number of second modules 48*b* and a corresponding increase in the number of first modules 48*a*, which provides overall savings in the number of module components in each chain-link converter 46.

The controller 56 further operates the chain-link converters 46 to inject one or more zero phase sequence triplen harmonic components to modulate the AC voltage waveform at each AC terminal 38 so that the peak voltage of the modulated AC voltage waveform 60 is lower in magnitude than the peak voltage of the fundamental component 58 of the AC voltage waveform. The injection of the or each zero phase sequence triplen harmonic components may be carried out through the operation of the chain-link converters to inject one or more zero phase sequence triplen harmonic voltage components.

By reducing 64 the peak voltage of the modulated AC voltage waveform 60 to be lower than the peak voltage of the fundamental component 58 of the AC voltage waveform, it becomes possible to reduce the voltage rating of the director switches 44 and chain-link converters 46 so as to permit optimisation of the number of components of the director switches 44 and chain-link converters 46 to provide savings in terms of cost, weight and footprint of the converter 30 and improve the efficiency of the converter 30. In particular the reduction in voltage rating of each chain-link converter 46 allows a corresponding reduction in the number of second modules 48*b* required to control the AC voltage waveform at the corresponding AC terminal 38 to have peak voltages that are respectively higher in magnitude than the DC voltages at the DC terminals 32,34.

Additionally, by reducing 64 the peak voltage of the modulated AC voltage waveform 60 to be lower than the peak voltage of the fundamental component 58 of the AC voltage waveform, it becomes possible to reduce voltage stress on an associated transformer to permit a reduction in the insulation class of the transformer and a reduction in clearance distance which enables a more compact station layout to be achieved.

FIG. 4 shows schematically a modulated AC voltage waveform 60 at an AC terminal 38 of the alternate arm converter 30 of FIG. 1. It can be seen from FIG. 4 that there is a reduction 62 in the magnitude of the modulated AC voltage waveform 60 in comparison to the magnitude of the fundamental component 58 of the AC voltage waveform during the formation of the current conduction path. It can also be seen from FIG. 4 that the peak voltage of the modulated AC voltage waveform 60 is lower than the peak voltage of the fundamental component 58 of the AC voltage waveform.

It is envisaged that, in other embodiments of the invention, each chain-link converter 46 may be replaced by a different voltage waveform synthesizer capable of controlling the modulation of the AC voltage waveform at the corresponding AC terminal 38.

Figure 5:
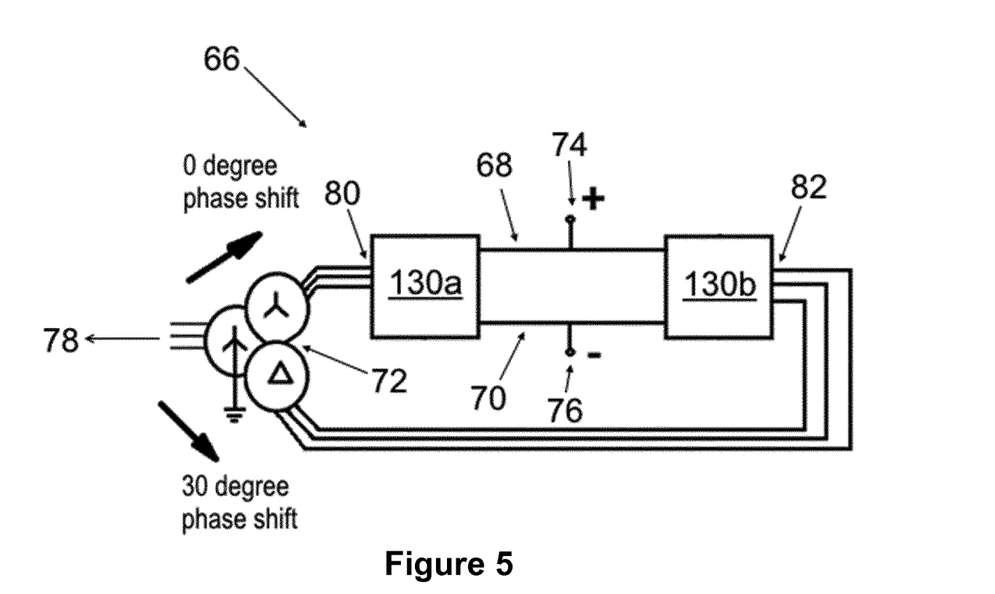
FIG. 5 shows schematically a parallel-connected converter assembly according to a second embodiment of the invention.

A parallel-connected converter assembly according to a second embodiment of the invention is shown in FIG. 5 and is designated generally by the reference numeral 66.

The parallel-connected converter assembly 66 comprises first and second converters 130*a*,130*b*, each of which is similar in structure and operation to the alternate arm converter 30 of FIG. 1. The parallel-connected converter assembly 66 further includes first and second DC transmission media 68,70 and a transformer assembly 72.

The first DC transmission medium 68 interconnects the first DC terminals 32 of the converters 130*a*,130*b*, while the second DC transmission medium 70 interconnects the second DC terminals 34 of the converters 130*a*,130*b*. A first DC network terminal 74 is defined in the first DC transmission medium 68, a second DC network terminal 76 is defined in the second DC transmission medium 70, and the first and second DC network terminals 74,76 are connected in use to respective DC voltages of a DC network 40.

The transformer assembly 72 includes a star-connected primary winding, a star-connected secondary winding, and a delta-connected secondary winding. More specifically, the primary winding of the transformer assembly 72 is connected to an AC network voltage 78 of the AC network 42, the star-connected secondary winding of the transformer assembly 72 is connected to a first AC voltage 80 at the AC side of the first converter 130a, and the delta-connected secondary winding of the transformer assembly 72 is connected to a second AC voltage 82 at the AC side of the second converter 130b. The use of the delta-connected secondary winding with the star-connected primary winding results in a 30 electrical degrees phase shift between the first and second AC voltages 80,82 relative to each other, as shown in FIG. 5.

In use, the parallel-connected converter assembly 66 is operated to transfer power between AC and DC networks 42,40. When compared to a single converter, a parallel-connected converter assembly 66 is compatible with higher current ratings at higher power ratings (e.g. 1000 MW or higher). Meanwhile each current conduction path may be formed in the respective converter 130a,130b during the operation of the parallel-connected converter assembly 66 to transfer power between the AC and DC networks 42,40, without significantly affecting the overall power transfer between the AC and DC networks 42,40.

The aforementioned cost, weight and footprint savings and improved efficiency as described hereinabove with reference to the converter 30 of FIG. 1 is beneficial when applied to the parallel-connected converter assembly 66 of FIG. 5 which comprises two converters 130a,130b connected in parallel.

As a result of the 30 electrical degrees phase shift between the first and second AC voltages 80,82, at least one harmonic current component appearing at an AC side of the first converter 130a is in anti-phase with at least one harmonic current component appearing at an AC side of the second converter 130b such that the harmonic current components cancel each other out when the appearance of each harmonic current component at the AC side of the corresponding converter 130a,130b is caused by the operation of the chain-link converters 46 to inject the at least one harmonic voltage component to modulate the AC voltage waveform at the AC terminal 38 of the corresponding converter 130a, 130b to be lower in magnitude in comparison to the fundamental component 58 of the AC voltage waveform.

The provision of the 30 electrical degrees phase shift between the first and second AC voltages 80,82 therefore allows each converter 130a,130b to inject the or at least one harmonic voltage component to modulate the AC voltage waveform at each AC terminal 38 to be lower in magnitude in comparison to the fundamental component 58 of the AC voltage waveform while the harmonic current components injected by the respective converters 130a,130b are cancelled by the transformer assembly 72 and therefore would not be seen in the AC lines directly connected to the AC network voltage 78. Cancelling the harmonic current components in this manner prevents the harmonic current components from adversely affecting the AC network voltage 78.

Figure 6:
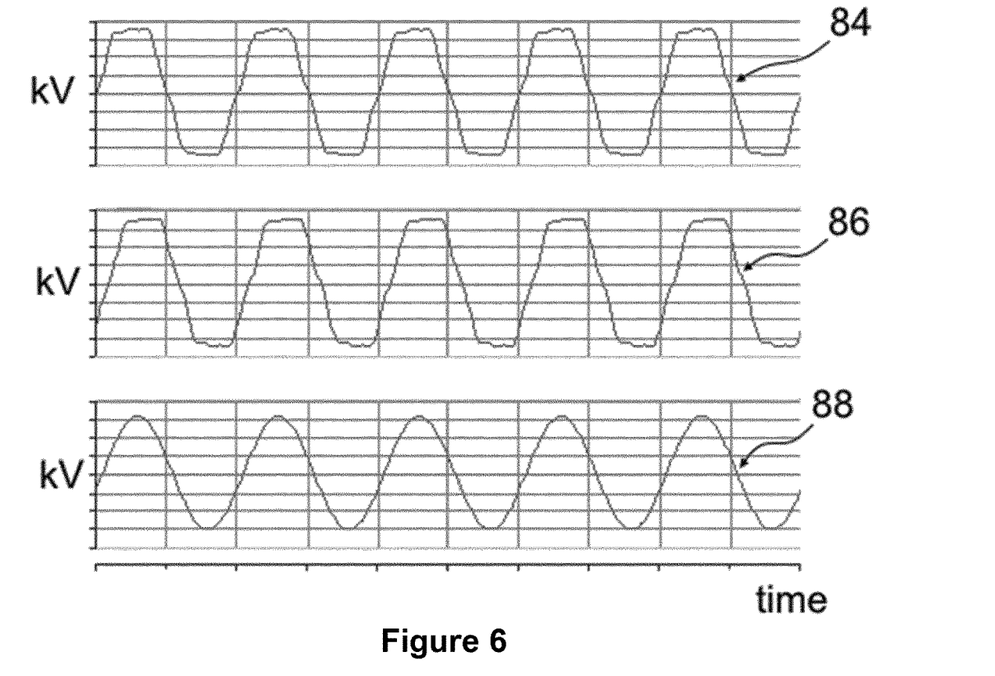
FIGS. 6 and 7 illustrate variations in phase voltage and current waveforms in the primary and secondary windings of the transformer assembly of the parallel-connected converter assembly of FIG. 5.
Figure 7:
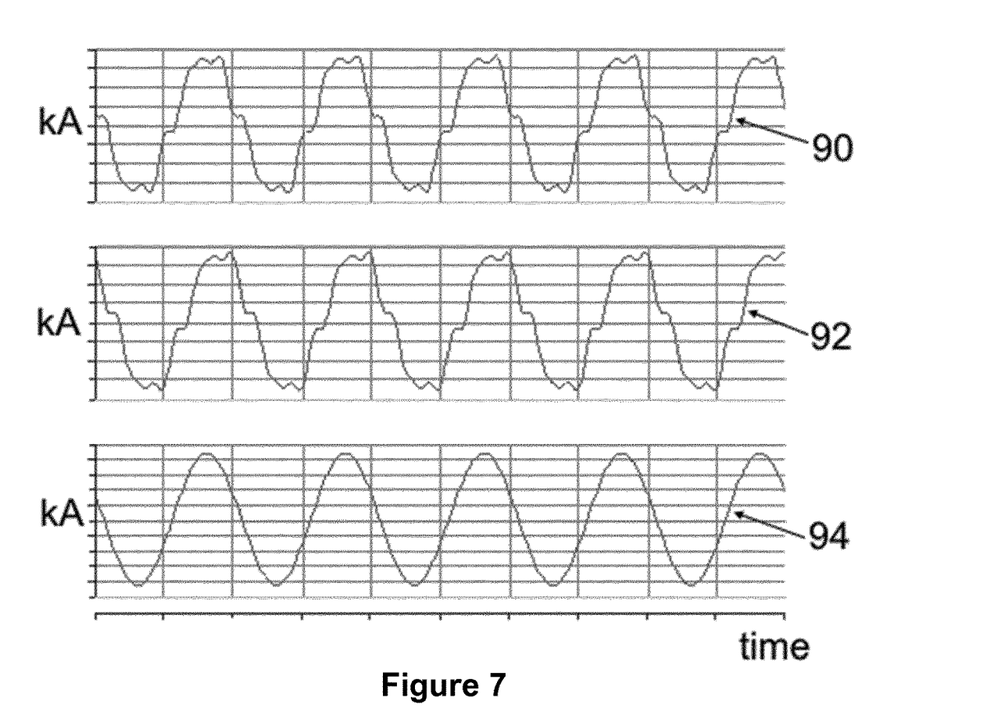

FIGS. 6 and 7 illustrate variations in phase voltage and current waveforms 84,86,88,90,92,94 in the primary and secondary windings of the transformer assembly 72 of the parallel-connected converter assembly 66 of FIG. 5. It can be seen from FIG. 6 that the application of a phase shift between the modulated phase voltage waveforms 84,86 of the star-connected and delta-connected secondary windings results in a substantially harmonic-free sinusoidal phase voltage waveform 88 in the primary winding. Similarly it can be seen from FIG. 7 that the application of a phase shift between the modulated phase voltage waveforms 84,86 of the star-connected and delta-connected secondary windings means that the associated harmonic current components appearing in the phase current waveforms 90,92 of the star-connected and delta-connected secondary windings do not appear in the phase current waveform 94 in the primary winding.

As a result of the injection of the at least one harmonic voltage component to modulate the AC voltage waveform at the AC terminal 38 of the corresponding converter 130a, 130b to be lower in magnitude in comparison to the fundamental component 58 of the AC voltage waveform, circulating currents appear in the converter 130a,130b such that the root square sum of the converter current at unity power factor is increased by a small percentage, e.g. 1%. The magnitude of the circulating currents depend on the magnitude of the injected harmonic voltage components as well as the transformer, converter limb and converter leakage impedances. Also, the circulating currents could become dominant during operation of the converters 130a,130b.

On the other hand the circulating currents have an almost negligible effect on the increase in current rating of the transformer. Although the circulating currents lead to additional power losses in the converters 130a,130b, the additional power losses are outweighed by the improvement in efficiency of the converters 130a,130b resulting from the aforementioned reduction of number of converter components, in particular the reduction in the number of director switches 44 and switching elements 50 in the converters 130a,130b.

The parallel-connected converter assembly may be configured to increase the number of channels in order to permit the use of higher order harmonic components.

For example, the transformer assembly may include a higher number of transformers connected in parallel with an appropriate vector group, with a corresponding increase in the number of parallel-connected converters in the parallel-connected converter assembly. One such configuration of the parallel-connected converter assembly is described as follows.

Figure 8:
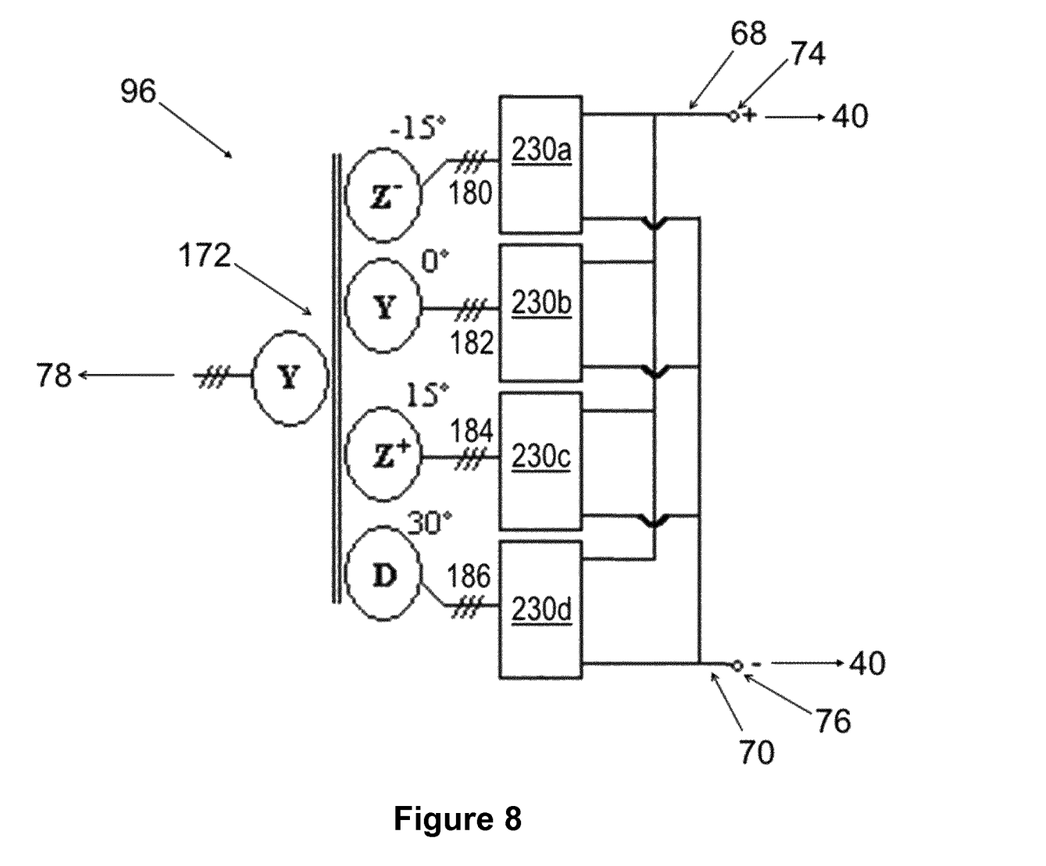
FIG. 8 shows schematically a parallel-connected converter assembly according to a third embodiment of the invention.

A parallel-connected converter assembly according to a third embodiment of the invention is shown in FIG. 8 and is designated generally by the reference numeral 96.

The parallel-connected converter assembly 96 of FIG. 8 is similar in structure and operation to the parallel-connected converter assembly 66 of FIG. 5, and like features share the same reference numerals. The parallel-connected converter assembly 96 of FIG. 8 differs from the parallel-connected converter assembly 66 of FIG. 5 in that the parallel-connected converter assembly 96 of FIG. 8 has a 24-pulse configuration.

The parallel-connected converter assembly 96 comprises first, second, third and fourth converters 230a,230b,230c, 230d, each of which is similar in structure and operation to the alternate arm converter 30 of FIG. 1. The parallel-connected converter assembly 96 further includes first and second DC transmission media 68,70 and a transformer assembly 172.

The first DC transmission medium 68 interconnects the first DC terminals 32 of the converters 230a,230b,230c, 230d, while the second DC transmission medium 70 interconnects the second DC terminals 34 of the converters 230a,230b,230c,230d. A first DC network terminal 74 is defined in the first DC transmission medium 68, a second DC network terminal 76 is defined in the second DC transmission medium 70, and the first and second DC network terminals 74,76 are connected in use to respective DC voltages of a DC network 40.

The transformer assembly 172 includes a star-connected primary winding, a first zigzag-connected secondary winding with a lagging angle of 15 electrical degrees, a second star-connected secondary winding, a third zigzag-connected secondary winding with a leading angle of 15 electrical degrees, and a fourth delta-connected secondary winding. More specifically, the primary winding of the transformer assembly 172 is connected to an AC network voltage 78 of the AC network 42, the first secondary winding of the transformer assembly 172 is connected to a first AC voltage 180 at the AC side of the first converter 230a, the second star-connected secondary winding of the transformer assembly 172 is connected to a second AC voltage 182 at the AC side of the second converter 230b, the third secondary winding of the transformer assembly 172 is connected to a third AC voltage 184 at the AC side of the third converter 230c, and the fourth delta-connected secondary winding of the transformer assembly 172 is connected to a fourth AC voltage 186 at the AC side of the fourth converter 230d. The configuration of the primary and secondary windings in this manner results in a 15 electrical degrees phase shift between the first and second AC voltages 180,182, a further 15 electrical degrees phase shift between the second and third AC voltages 182,184, and a still further 15 electrical degrees phase shift between the third and fourth AC voltages 184, 186, such that there is a 30 electrical degrees phase shift between the first and third AC voltages 180,184 relative to each other and there is a 30 electrical degrees phase shift between the second and fourth AC voltages 182,186 relative to each other, as shown in FIG. 8.

In use, the parallel-connected converter assembly 96 is operated to transfer power between AC and DC networks 42,40. Meanwhile each current conduction path may be formed in the respective converter 230a,230b,230c,230d during the operation of the parallel-connected converter assembly 96 to transfer power between the AC and DC networks 42,40, without significantly affecting the overall power transfer between the AC and DC networks 42,40.

As a result of the phase shifts between the AC voltages, the harmonic current components appearing at the AC side of the converters 230a,230b,230c,230d are cancelled out when the appearance of each harmonic current component at the AC side of the corresponding converter 230a,230b,230c, 230d is caused by the operation of the chain-link converters 46 to inject the at least one harmonic voltage component to modulate the AC voltage waveform at the AC terminal 38 of the corresponding converter 230a,230b,230c,230d to be lower in magnitude in comparison to the fundamental component 58 of the AC voltage waveform. In this embodiment, the or each harmonic voltage component is selected from a group including 11$^{th}$ and 13$^{th}$ harmonic voltage components.

The provision of the phase shifts between the AC voltages therefore allows each converter 230a,230b,230c,230d to inject the or at least one harmonic voltage component to modulate the AC voltage waveform at each AC terminal 38 to be lower in magnitude in comparison to the fundamental component 58 of the AC voltage waveform while the harmonic current components injected by the respective converters 230a,230b,230c,230d are cancelled by the transformer assembly 172 and therefore would not be seen in the AC lines directly connected to the AC network voltage 78. Cancelling the harmonic current components in this manner prevents the harmonic current components from adversely affecting the AC network voltage 78.

It is envisaged that, in other embodiments of the invention, each converter may include a different number of converter limbs, wherein the AC terminal of each converter limb is connectable to a respective phase of a multi-phase AC voltage. It is further envisaged that, in other embodiments of the invention, the converter may include a single converter limb wherein the AC terminal is connectable to a single-phase AC voltage.

It will be appreciated that the topology of each converter 30,130a,130b,230a,230b,230c,230d in the embodiments shown is merely chosen to help illustrate the working of the invention, and may be replaced by another type of converter topology.

It will be appreciated that each numerical value given for the embodiment shown is merely chosen to help illustrate the working of the invention, and may be replaced by another numerical value.

The invention claimed is:

1. A converter comprising first and second DC terminals connectable in use to a DC network, the converter including a converter limb extending between the DC terminals, the converter limb including first and second limb portions separated by an AC terminal, the AC terminal connectable in use to an AC voltage, each limb portion including at least one director switch connected in series with a waveform synthesizer between the AC terminal and a respective one of the first and second DC terminals, the waveform synthesizers operable to control the modulation of an AC voltage waveform at the AC terminal, each director switch operable to switch the respective waveform synthesizer into and out of circuit between the respective DC terminal and the AC terminal; and a controller programmed to selectively control the switching of the director switches to switch both of the limb portions into circuit concurrently to form a current conduction path between the DC terminals, the current conduction path configured to carry a current for presentation to the DC network, wherein the controller is programmed to selectively operate the waveform synthesizers to inject at least one harmonic component to modulate the AC voltage waveform at the AC terminal so that during the formation of the current conduction path the magnitude of the modulated AC voltage waveform is lower than the magnitude of the fundamental component of the AC voltage waveform, and wherein the at least one harmonic component is a non-triplen harmonic component.

2. The converter according to claim 1 wherein the at least one harmonic component is an odd-numbered and non-triplen harmonic component.

3. The converter according to claim 1 wherein the at least one harmonic component is selected from a group including 5$^{th}$, 7$^{th}$, 11$^{th}$, 13$^{th}$, 17$^{th}$, 19$^{th}$, 23$^{rd}$ and 27$^{th}$ harmonic components.

4. The converter according to claim 1 wherein the or each harmonic component is a harmonic voltage component or a harmonic current component.

5. The converter according to claim 1 wherein the converter includes a plurality of converter limbs, each converter limb extending between the DC terminals, the AC terminal of each converter limb being connectable in use to a respective phase of a multi-phase AC voltage.

6. The converter according to claim 1 wherein each waveform synthesizer is or includes a chain-link converter.

7. The converter according to claim 6 wherein each chain-link converter includes at least one first module, the or each first module including at least one switching element and at least one energy storage device, the or each switching element and the or each energy storage device in the or each first module arranged to be combinable to selectively provide a unidirectional voltage source.

8. The converter according to claim 7 wherein each chain-link converter further includes at least one second module, the or each second module including at least one switching element and at least one energy storage device, the or each switching element and the or each energy storage device in the or each second module arranged to be combinable to selectively provide a bidirectional voltage source.

9. The converter according to claim 1 wherein the controller is further programmed to selectively operate the waveform synthesizers to inject one or more zero phase sequence triplen harmonic components to modulate the AC voltage waveform at the AC terminal so that the peak voltage of the modulated AC voltage waveform is lower in magnitude than the peak voltage of the fundamental component of the AC voltage waveform.

10. A parallel-connected converter assembly comprising a plurality of converters, wherein at least one or each of the converters is in accordance with claim 1, the parallel-connected converter assembly including first and second DC transmission media, the first and second DC transmission media respectively including first and second DC network terminals connectable in use to a DC network, the first DC transmission medium interconnecting the first DC terminals of the converters, the second DC transmission medium interconnecting the second DC terminals of the converters.

11. The parallel-connected converter assembly according to claim 10 wherein the AC terminal of each converter is connected to a respective AC voltage, and the AC voltages are configured to be phase shifted relative to each other.

12. The parallel-connected converter assembly according to claim 11 wherein the AC voltages are configured to be phase shifted relative to each other so that, in use, the harmonic current components appearing at the AC sides of the converters cancel each other out, wherein the appearance of each harmonic current component at the AC side of the corresponding converter is caused by the operation of the waveform synthesizers to inject the at least one harmonic component to modulate the AC voltage waveform at the AC terminal of the corresponding converter.

13. The parallel-connected converter assembly according to claim 11 wherein the AC voltages are operatively linked to an AC network voltage, the parallel-connected converter assembly further includes a transformer assembly configured to connect the AC network voltage to the AC voltages, and the transformer assembly is configured so that the AC voltages are phase shifted relative to each other.

14. The parallel-connected converter assembly according to claim 13 wherein the plurality of converters include first and second converters, the transformer assembly is configured in an arrangement in which a primary winding of the transformer assembly is connected to the AC network voltage, a star-connected secondary winding of the transformer assembly is connected to a first of the AC voltages, and a delta-connected secondary winding of the transformer assembly is connected to a second of the AC voltages.

15. The parallel-connected converter assembly according to claim 13 wherein the plurality of converters include first, second, third and fourth converters, the transformer assembly is configured in an arrangement in which a primary winding of the transformer assembly is connected to the AC network voltage, a first zigzag-connected secondary winding of the transformer assembly is connected to a first of the AC voltages, a second star-connected secondary winding of the transformer assembly is connected to a second of the AC voltages, a third zigzag-connected secondary winding of the transformer assembly is connected to a third of the AC voltages, and a fourth delta-connected secondary winding of the transformer assembly is connected to a fourth of the AC voltages.

* * * * *